(12) United States Patent
Baek

(10) Patent No.: US 9,584,728 B2
(45) Date of Patent: Feb. 28, 2017

(54) APPARATUS AND METHOD FOR DISPLAYING AN IMAGE IN AN ELECTRONIC DEVICE

(71) Applicant: Samsung Electronics Co., Ltd., Suwon-si, Gyeonggi-do (KR)

(72) Inventor: Woo-Hyun Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 14/596,578

(22) Filed: Jan. 14, 2015

(65) Prior Publication Data

US 2015/0206317 A1 Jul. 23, 2015

(30) Foreign Application Priority Data

Jan. 17, 2014 (KR) .................. 10-2014-0005892

(51) Int. Cl.
*G09G 5/02* (2006.01)
*H04N 5/232* (2006.01)
(52) U.S. Cl.
CPC ..... *H04N 5/23293* (2013.01); *H04N 5/23267* (2013.01)

(58) Field of Classification Search
CPC ................. H04N 5/23296; H04N 5/23248
USPC ............................................ 345/625
See application file for complete search history.

(56) References Cited

U.S. PATENT DOCUMENTS

| 2011/0254972 A1* | 10/2011 | Yaguchi | H04N 5/23219 348/222.1 |
|---|---|---|---|
| 2013/0215291 A1 | 8/2013 | Baek et al. | |
| 2014/0300765 A1* | 10/2014 | Takao | H04N 5/23274 348/208.1 |
| 2014/0325439 A1* | 10/2014 | Sohn | G06F 3/04883 715/810 |

FOREIGN PATENT DOCUMENTS

KR 10-2013-0094661 A 8/2013

* cited by examiner

*Primary Examiner* — Thomas Lett
(74) *Attorney, Agent, or Firm* — Jefferson IP Law, LLP

(57) ABSTRACT

A method for operating an electronic device is provided. The method includes displaying a first image obtained by an image sensor, obtaining a plurality of crop images cropped in response to a change in an angle of view of the image sensor from the first image, and sequentially displaying the plurality of crop images.

18 Claims, 10 Drawing Sheets

CROP DIRECTION DURING PREVIEW -> RECORDING

CROP DIRECTION DURING RECORDING --> PREVIEW

APPARATUS AND METHOD FOR DISPLAYING AN IMAGE IN AN ELECTRONIC DEVICE

CROSS-REFERENCE TO RELATED APPLICATION(S)

This application claims the benefit under 35 U.S.C. §119 (a) of a Korean patent application filed on Jan. 17, 2014 in the Korean Intellectual Property Office and assigned Serial number 10-2014-0005892, the entire disclosure of which is hereby incorporated by reference.

TECHNICAL FIELD

The present disclosure relates to a method for processing an image and an electronic device thereof.

BACKGROUND

With development of information and telecommunication technology and a semiconductor technology, electronic devices have evolved into multimedia devices providing various multimedia services. For example, a multimedia device provides various multimedia services such as a messenger service, a broadcasting service, a wireless Internet service, a camera service, and a music reproduction service. These multimedia devices may include a mega-pixel camera module to enable still image shooting and moving picture shooting, and obtain a unique photo of its own to which various shooting effects have been applied.

Recently, when taking photographs using an electronic device, a hand trembling correction function for preventing a problem of afterimages occurring in a shot image due to a user's hand trembling or unintended movement is provided. For this hand trembling correction, several methods are in use, including Digital Image Stabilization (DIS), Electronic Image Stabilization (EIS), and Optical Image Stabilization (OIS).

The above information is presented as background information only to assist with an understanding of the present disclosure. No determination has been made, and no assertion is made, as to whether any of the above might be applicable as prior art with regard to the present disclosure.

SUMMARY

When an electronic device performs image stabilization such as hand trembling correction, crop is inevitable in an internal algorithm, so that a loss in an angle of view occurs. For example, an electronic device feels an abrupt change in an angle of view when recording starts, during a specific shot, or during a specific shooting mode. Accordingly, an aspect of the present invention is to provide a natural visual effect even under a circumstance where an angle of view changes.

Aspects of the present disclosure are to address at least the above-mentioned problems and/or disadvantages and to provide at least the advantages described below. Accordingly, an aspect of the present disclosure is to provide a method for processing an image, for preventing a hand trembling phenomenon in an electronic device and an electronic device thereof.

Another aspect of the present disclosure is to provide a method for processing an image, for providing a natural visual effect even under a circumstance where an angle of view changes in an electronic device and an electronic device thereof.

Another aspect of the present disclosure is to provide a method for processing an image, for understanding a shooting state in an electronic device and an electronic device thereof.

In accordance with an aspect of the present disclosure, a method for operating an electronic device is provided. The method includes displaying a first image obtained by an image sensor, obtaining a plurality of crop images cropped in response to a change in an angle of view of the image sensor from the first image, and sequentially displaying the plurality of crop images.

In accordance with another aspect of the present disclosure, an electronic device is provided. The electronic device includes a memory, an image sensor, and a processor configured to control to display a first image obtained by the image sensor, to obtain a plurality of crop images cropped in response to a change in an angle of view of the image sensor from the first image, and to sequentially display the plurality of crop images.

As described above, an electronic device may provide a natural visual effect even under an angle of view changes by sequentially displaying a plurality of crop images cropped in response to a change in an angle of view.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may include one or more of a smartphone, a tablet Personal Computer (PC), a mobile phone, a video phone, an electronic book reader, a desktop PC, a laptop PC, a netbook computer, a Personal Digital Assistant (PDA), a Portable Media Player (PMP), an MP3 player, an ornament, an appcessory, a camera, a wearable device, a wrist watch, a refrigerator, an air conditioner, a cleaner, an artificial intelligence robot, a Television (TV), a Digital Versatile Disc (DVD) player, an audio player, an oven, an electronic range, a washing machine, an electronic bracelet, an electronic necklace, an air purifier, an electronic frame, a medical device, a navigation device, a satellite signal receiver, an Event Data Recorder (EDR), a Flight Data Recorder (FDR), a set-top box, a TV box, an electronic dictionary, an automobile infotainment device, electronic equipment for ships, an aviation electronic device, a security device, electronic clothes, an electronic key, a camcorder, a game console, a head-mounted display (HMD), a flat display device, an electronic album, a portion of a furniture or building/structure including an electronic device, an electronic board, an electronic sign input unit, and a projector. Also, it is obvious to a person of ordinary skill in the art that the electronic device according to the present disclosure is not limited to the above devices.

Figure 1:
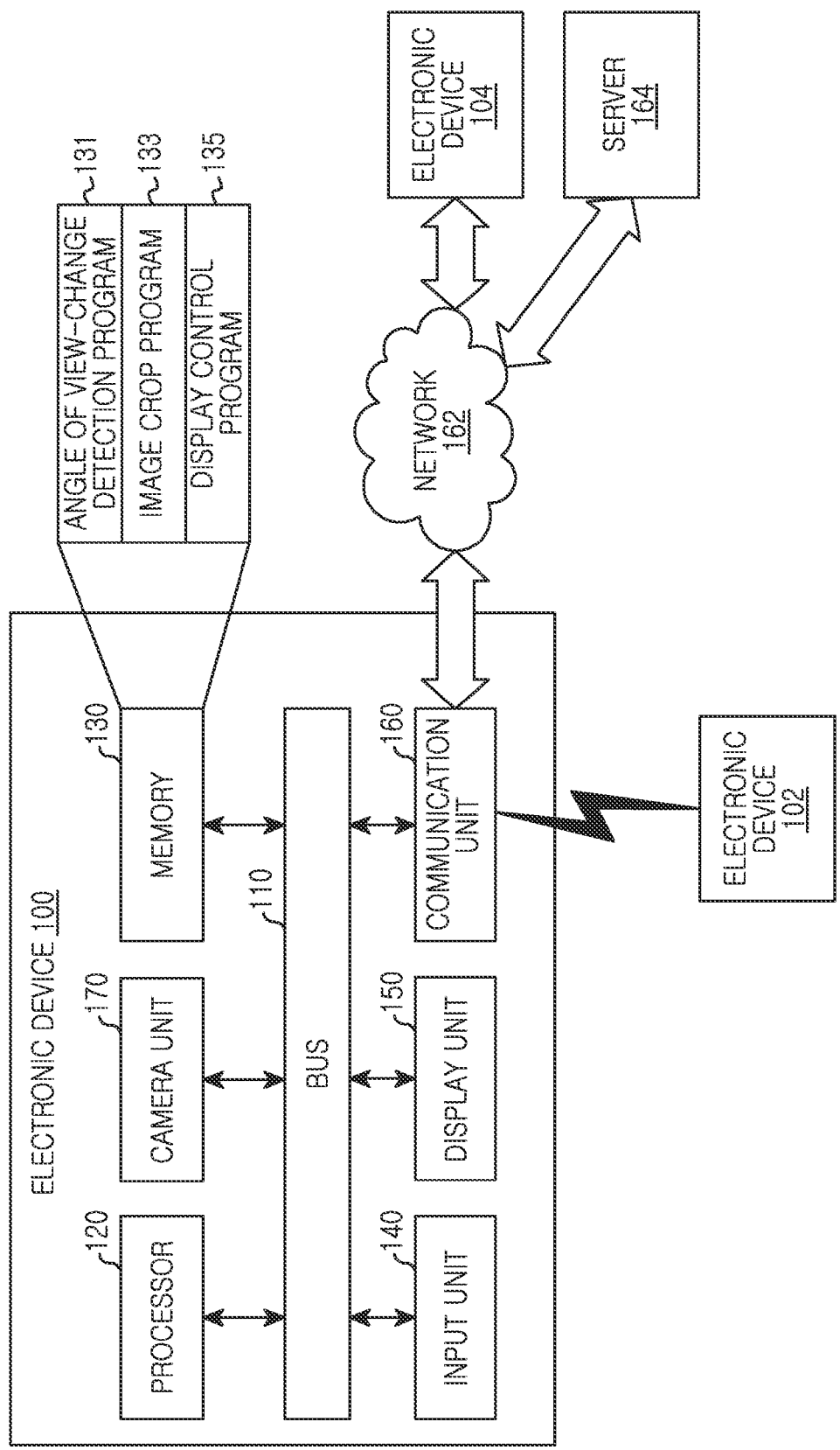
FIG. 1 is a block diagram illustrating an electronic device according to an embodiment of the present disclosure.

FIG. 1 is a block diagram illustrating an electronic device according to an embodiment of the present disclosure.

Referring to FIG. 1, the electronic device 100 may include a bus 110, a processor 120, a memory 130, an input unit 140, a display unit 150, a communication unit 160, and a camera unit 170.

The bus 110 may connect elements (e.g., the processor 120, the memory 130, the input unit 140, the display unit 150, the communication unit 160, and the camera unit 170) included in the electronic device 100 with each other and control communication between the elements.

The processor 120 may receive an instruction from the elements included in the electronic device 100 via the bus 110, decipher the received instruction, and perform an operation or a data process corresponding to the deciphered instruction. The processor 120 may control to execute at least one program stored in the memory 130 and provide a service corresponding to the relevant program. For example, the processor 120 may execute an angle of view-change detection program 131, an image crop program 133, and a display control program 135 to display a first image obtained by an image sensor, and obtain a plurality of crop images cropped in response to a change in an angle of view of the image sensor from the first image, and sequentially display the obtained plurality of crop images.

The processor 120 may include one or more Application Processors (APs) or one or more Communication Processors (CPs). The AP and the CP may be included inside the processor 120 or included in different Integrated Circuit (IC) packages, respectively. The AP and the CP may be included inside one IC package.

The AP may drive an Operating System (OS) or an application to control a plurality of hardware or software elements connected to the AP, and perform various data processes including multimedia data and operations. The AP may be implemented as a System on Chip (SoC).

The CP may perform at least a portion of a multimedia control function. The CP may also perform discrimination and authentication of a terminal inside a communication network using a subscriber identity module (SIM) (e.g., a SIM card). The CP may provide a service including voice communication, video communication, a short message, or a packet data. The CP may control data transmission/reception of the communication unit 160.

The AP or the CP may load an instruction or data received from at least one of a non-volatile memory or other elements connected thereto onto a volatile memory and process the same. The AP or the CP may store data received from at least one of other elements or generated by at least one of the other elements in a non-volatile memory. The CP may perform a function of managing a data link and converting a communication protocol in the communication between the electronic device including hardware and other electronic devices connected via a network. Here, the CP may be implemented as an SoC.

The processor 120 may include one or more data processors, image processors, and a CODEC. In the electronic device 100, a data processor, an image processor, or a CODEC may be configured separately.

Additionally, the processor 120 may further include a Graphics Processing Unit (GPU).

The memory 130 may store an instruction or data received from one or more elements (e.g., the processor 120, the input unit 140, the display unit 150, the communication unit 160, or the camera unit 170) or generated by one or more elements.

The memory 130 may store one or more programs for a service of the electronic device 100. For example, the memory 130 may include the angle of view-change detection program 131, the image crop program 133, and the display control program 135. Each program may be configured using a programming module, and each programming module may be configured using software, firmware, hardware, or a combination of at least two of these.

The angle of view-change detection program 131 may include at least one software element for detecting a change in an angle of view of an image sensor. For example, the angle of view-change detection program 131 may detect a change in an angle of view corresponding to a hand trembling prevention function and detect an angle of view-change value. The angle of view-change detection program 131 may detect a change in an angle of view in a specific shooting mode.

The image crop program 133 may include at least one software element for cropping a relevant image at a specific ratio depending on the detected angle of view-change value. For example, the image crop program 133 may obtain a plurality of crop images such as 2281*1284, 2258*1272, 2235*1260, 2212*1248, and the like, that crop an image of a resolution of 2304*1296 which is a last frame of a preview at a specific ratio (for example, 1%). In case of determining an angle of view-reduction amount is 10%, the image crop program 133 may crop an image of resolution of 2304*1296 at a ratio of 1% ten times to obtain ten crop images. However, the image crop program 133 is not limited thereto, and the image crop program 133 may crop a relevant image at various ratios depending on an angle of view-change value, and the number of cropped images may be also various.

For another example, the image crop program 133 may obtain a plurality of crop images such as 1943*1092, 1966*1104, 1989*1116, 2012*1128, etc. that crop, in a way opposite to the above method, an image of a resolution of 2304*1296 which is a last frame of a preview at a specific ratio (for example, 1%). In case of determining an angle of view-increase amount as 10%, the image crop program 133 may crop an image of resolution of 2304*1296 at a ratio of 1% ten times to obtain ten crop images. However, the image crop program 133 is not limited thereto, and the image crop program 133 may crop a relevant image at various ratios depending on an angle of view-change value, and the number of cropped images may be also various.

The display control program 135 may include at least one software element for sequentially displaying a plurality of obtained crop images. The display control program 135 may sequentially display the plurality of obtained crop images on a screen so that they are suitable for a preview ratio. In this case, the electronic device may provide a smooth visual effect to a user by sequentially displaying the plurality of crop images within a short time.

The memory 130 may also include a built-in memory or an external memory. The built-in memory may include at least one of a volatile memory (e.g., dynamic Random Access Memory (DRAM), static RAM (SRAM), synchronous dynamic RAM (SDRAM)) and a non-volatile memory (e.g., one time programmable Read Only Memory (OTPROM), programmable ROM (PROM), erasable and programmable ROM (EPROM), electrically erasable and programmable ROM (EEPROM), mask ROM, flash ROM, Not And (NAND) flash memory, Not Or (NOR) flash memory). At this point, the built-in memory may have the form of a Solid State Drive (SSD). The external memory may include at least one of compact flash (CF), secure digital (SD), Micro-SD, Mini-SD, extreme digital (xD), or a memory stick.

The memory 130 may also further include a kernel, a middleware, and an application programming interface (API).

The kernel may control or manage system resources (e.g., the bus 110, the processor 120, or the memory 130) used for executing an operation or a function implemented in the rest of the programming modules (e.g., the middleware, the API, or the application). The kernel may also provide an interface for allowing the middleware, the API, or the application to access an individual element of the electronic device 100 and control or manage the same.

The middleware may perform a mediation role so that the API or the application may communicate with the kernel to give and take data. In connection with task requests received from at least one application, the middleware may perform load balancing for a task request using a method of assigning priority that may use a system resource (e.g., the bus 110, the processor 120, or the memory 130) of the electronic device 100.

The API is an interface for allowing the application to control a function provided by the kernel or the middleware, and may include at least one interface or function for file control, window control, image processing, or character control.

The input unit 140 may transfer an instruction or data generated by a user's selection to the processor 120 or the memory 130 via the bus 110. For example, the input unit 140 may include a touch panel, a pen sensor, a key, an ultrasonic input unit, or other pointer devices.

The touch panel may recognize a touch input using at least one of capacitive, resistive, infrared, or ultrasonic methods. A capacitive touch panel may perform proximity recognition as well as a direct touch. The proximity touch may be expressed as a non-contact touch or hovering. This touch panel may further include a tactile layer and provide tactile reaction to a user. The touch panel may further include a controller.

The display unit 150 may display an image, a video, or data to a user. The display unit 150 may include a touch panel to perform an input function and a display function simultaneously. The touch panel may include a Liquid Crystal Display (LCD) or an Active Matrix Organic Light Emitting Diode (AMOLED), and may be implemented such that the touch panel is transparent or wearable.

The display unit 150 may include a hologram, and this hologram may show a three-dimensional image in the air using interference of light. The display unit 150 may further include a control circuit for controlling a touch panel or a hologram.

The communication unit 160 may connect communication between the electronic device 100 and one or more other electronic devices 102 or 104 or a server 164, and may communicate with, for example, the electronic device 104 and the server 164 over a network 162. The communication unit 160 may support a short distance communication protocol (e.g. Wi-Fi, Bluetooth (BT), Near Field Communication (NFC), or network communication (e.g., the Internet, Local Area Network (LAN), Wide Area Network (WAN), telecommunication network, cellular network, satellite network, or plain old telephone service (POTS))).

The camera unit 170 may perform a camera function such as photo capturing, video clip, recording, etc. using an image sensor. The camera unit 170 may include a Charged Coupled Device (CCD) or a Complementary Metal-Oxide Semiconductor (CMOS). The camera unit 170 may also adjust change of hardware configuration, for example, lens movement, an aperture number, etc. depending on a camera program executed by the electronic device 100.

The camera unit 170 may provide a collected image obtained via shooting for an object to the processor 120. The camera unit 170 may include an image sensor for converting an optical signal to an electric signal, an image processor for converting an analog image signal to a digital image signal, and a signal processor for image-processing an image signal so that the image signal output from the image processor may be displayed on the display unit 150.

The camera unit 170 may include an actuator for moving a lens, and a driver IC for driving the actuator, etc. The camera unit 170 may move a lens using at least one of a Voice Coil Motor (VCM) method, a piezo method, and a liquid lens method, or adjust a focal length via a physical property change by an electric characteristic.

Also, the camera unit 170 may perform a CAF function and a TAF function for optimized focusing, and apply at least one of Video Digital Image Stabilization (VDIS), Electronic Image Stabilization (EIS), and Optical Image Stabilization (OIS) in order to correct hand trembling.

Additionally, the electronic device 100 may include a sensor module. This sensor module may include at least one of a gesture sensor, a gyro sensor, an atmospheric pressure sensor, a magnetic sensor, an acceleration sensor, a grip sensor, a proximity sensor, a living body sensor, a temperature sensor, a humidity sensor, an illuminance sensor, or an ultra violet sensor.

The sensor module may measure a physical quantity or detect an operation state of the electronic device 100 to convert the measured or detected information to an electric signal. For example, the sensor module may include an E-nose sensor, an electromyography (EMG) sensor, an electroencephalogram (EEG) sensor, an electrocardiogram (ECG) sensor, or a fingerprint sensor.

Names of elements of the electronic device 100 according to various embodiments of the present disclosure may change depending on a kind of the electronic device 100. The electronic device 100 may include one or more elements among the above-described elements, omit a portion of the elements, or further include additional other elements depending on a kind of the electronic device 100.

Figure 2:
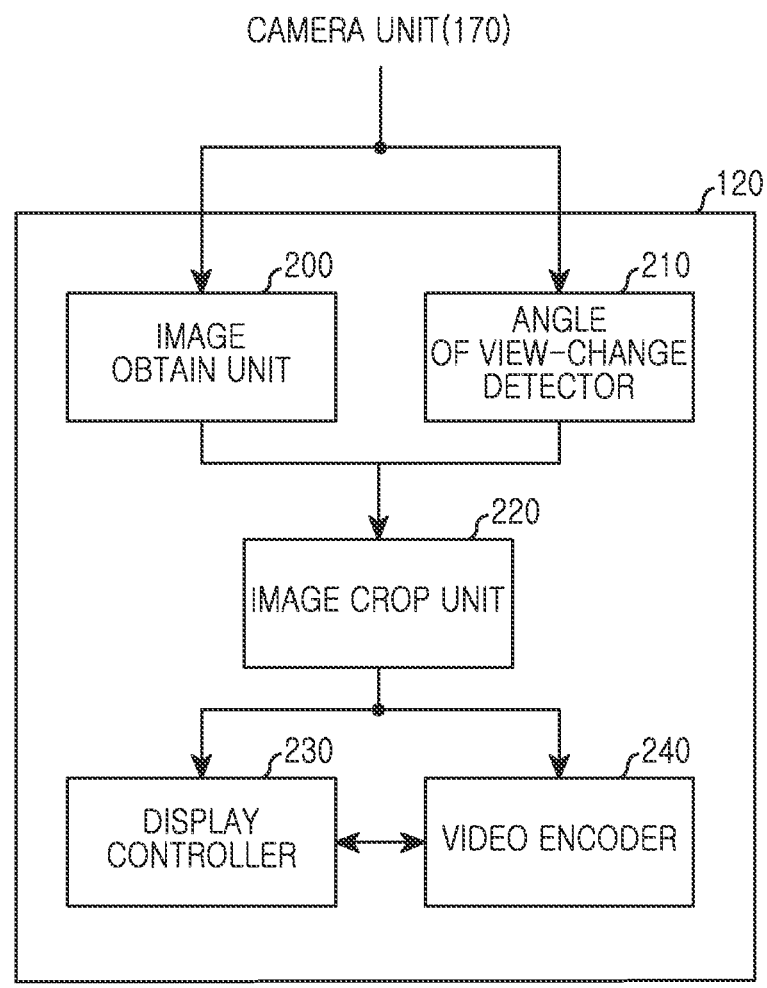
FIG. 2 is a detailed block diagram illustrating a processor according to an embodiment of the present disclosure.

FIG. 2 is a detailed block diagram illustrating a processor according to an embodiment of the present disclosure.

Referring to FIG. 2, the processor 120 may include an image obtain unit 200, an angle of view-change detector 210, an image crop unit 220, a display controller 230, and a video encoder 240.

The image obtain unit 200 may obtain an image of an object via the camera unit 170. The image obtain unit 200 may receive a preview image and a recording image from the image sensor. The image obtain unit 200 may provide the preview image and the recording image to the image crop unit 220.

The angle of view-change detector 210 may execute an angle of view-change detection program 131 stored in the memory 130 to detect a change in an angle of view of the image sensor, and detect a change value in an angle of view. The angle of view-change detector 210 may detect a change in an angle of view depending on a hand trembling prevention function. The angle of view-change detector 210 may detect a change in an angle of view depending on moving picture recording. The angle of view-change detector 210 may detect a change in an angle of view during a specific shooting mode. The angle of view-change detector 210 may detect a change value in an angle of view, and provide the change value to the image crop unit 220.

The image crop unit 220 may execute the image crop program 133 stored in the memory 130 to crop an image provided from the image obtain unit 200 at a specific ratio depending on an angle of view-change value provided from the angle of view-change detector 210.

For example, the image crop unit 220 may obtain a plurality of crop images, such as 2281*1284, 2258*1272, 2235*1260, 2212*1248, and the like, that crop an image of a resolution of 2304*1296 which is a last frame of a preview at a specific ratio (for example, 1%). In case of determining an angle of view-reduction amount as 10%, the image crop unit 220 may crop an image of resolution of 2304*1296 at a ratio of 1% ten times to obtain ten crop images. However, the image crop unit 220 is not limited thereto, and the image crop unit 220 may crop a relevant image at various ratios depending on an angle of view-change value and the number of cropped images may be also various.

In another example, the image crop unit 220 may obtain a plurality of crop images, such as 1943*1092, 1966*1104, 1989*1116, 2012*1128, and the like, that crop, in a way opposite to the above method, an image of a resolution of 2304*1296 which is a last frame of a preview at a specific ratio (for example, 1%). In case of determining an angle of view-increase amount as 10%, the image crop unit 220 may crop an image of resolution of 2304*1296 at a ratio of 1% ten times to obtain ten crop images. However, the image crop unit 220 is not limited thereto, and the image crop unit 220 may crop a relevant image at various ratios depending on an angle of view-change value, and the number of cropped images may be also various.

The image crop unit 220 may provide the plurality of obtained crop images to the display controller 230 or the video encoder 240.

The display controller 230 may control to execute the display control program 135 stored in the memory 130 and sequentially display a plurality of crop images provided from the image crop unit 220. The display controller 230 may sequentially display the plurality of obtained crop images on the screen such that they are suitable for a preview ratio. In this case, the electronic device may provide a smooth visual effect to a user by sequentially displaying the plurality of crop images within a short time.

The video encoder 240 may record a moving picture together with a plurality of crop images provided from the image crop unit 220 or the display controller 230. In this case, the electronic device may provide a smooth visual effect in a recorded stored moving picture by sequentially displaying the plurality of crop images within a short time.

When not receiving a plurality of crop images from the image crop unit 220, the display controller 230 or the video encoder 240 may receive crop coordinate information for an image to be cropped and perform self-cropping.

Though elements of the processor 120 may be configured as separate modules according to various embodiments of the present disclosure, they may be included as elements of the camera unit 170.

Figure 3:
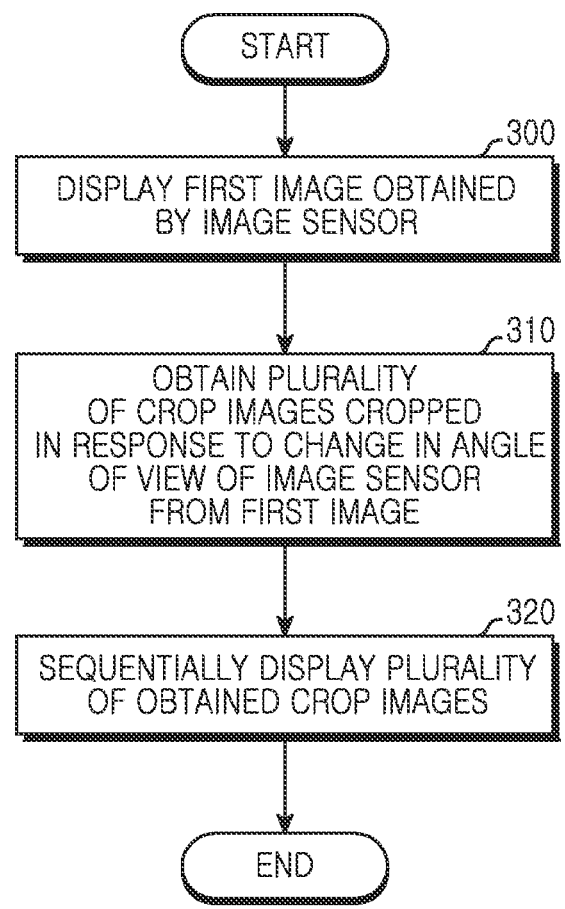
FIG. 3 is a flowchart illustrating a procedure for providing a visual effect depending on a change in an angle of view in an electronic device according to an embodiment of the present disclosure.

FIG. 3 is a flowchart illustrating a procedure for providing a visual effect depending on a change in an angle of view in an electronic device according to an embodiment of the present disclosure.

Referring to FIG. 3, the electronic device may display a first image obtained by an image sensor in operation 300. The electronic device may display the first image which is a preview image input from the image sensor on a screen.

The electronic device may obtain a plurality of crop images cropped in response to a change in an angle of view of the image sensor from the first image in operation 310. The electronic device may detect a change in an angle of view corresponding to a hand trembling prevention function. The electronic device may detect a change in an angle of view corresponding to moving picture recording. The electronic device may detect a change in an angle of view during a specific shooting mode. However, exemplary embodiments of the present disclosure are not limited thereto, and various circumstances where an angle of view may change may exist.

When detecting reduction in an angle of view, the electronic device may crop the first image at a specific ratio depending on an angle of view-reduction amount. For example, the electronic device may obtain a plurality of crop images, such as 2281*1284, 2258*1272, 2235*1260, 2212*1248, and the like, that crop an image of a resolution of 2304*1296 which is a last frame of a preview at a specific ratio (for example, 1%). At this point, in case of determining an angle of view-reduction amount as 10%, the electronic device may crop an image of resolution of 2304*1296 at a ratio of 1% ten times to obtain ten crop images. However, the electronic device may crop a relevant image at various ratios depending on an angle of view-change value, and the number of cropped images may also vary.

When detecting an increase in an angle of view, the electronic device may crop the first image at a specific ratio depending on an angle of view-increase amount. For example, the electronic device may obtain a plurality of crop images, such as 1943*1092, 1966*1104, 1989*1116, 2012*1128, and the like, that crop, in a way opposite to the above method, an image of a resolution of 2304*1296 which is a last frame of a preview at a specific ratio (for example, 1%). At this point, in case of determining an angle of view-increase amount as 10%, the electronic device may crop an image of resolution of 2304*1296 at a ratio of 1% ten times to obtain ten crop images. However, the electronic device may crop a relevant image at various ratios depending on an angle of view-change value, and the number of cropped images may also vary.

The electronic device may sequentially display a plurality of obtained crop images in operation 320. The electronic device may sequentially display the plurality of obtained crop images on the screen such that the crop images are suitable for a preview ratio. In this case, the electronic device may provide a smooth visual effect to a user by sequentially displaying the plurality of crop images within a short time.

Figure 4:
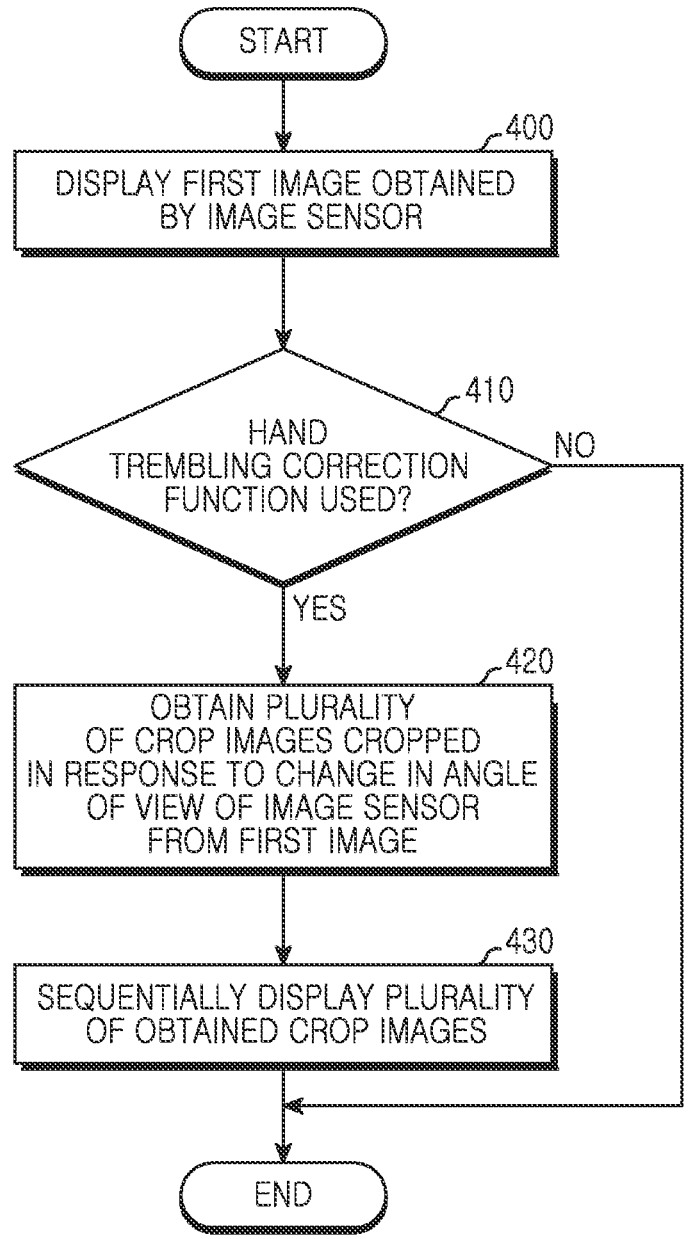
FIG. 4 is a flowchart illustrating a procedure for providing a visual effect depending on a change in an angle of view in an electronic device according to an embodiment of the present disclosure.

FIG. 4 is a flowchart illustrating a procedure for providing a visual effect depending on a change in an angle of view in an electronic device according to an embodiment of the present disclosure.

Referring to FIG. 4, the electronic device may display a first image obtained by an image sensor in operation 400. At this point, the electronic device may display the first image which is a preview image input from the image sensor on a screen.

The electronic device may determine whether to use a hand trembling correction function in operation 410. The electronic device may control to execute the hand trembling correction function during a specific shooting mode. For example, the electronic device may allow the hand trembling correction function to be activated when performing video recording. The electronic device may control to allow the hand trembling function to be executed depending on user selection.

In case of using the hand trembling correction function, the electronic device may obtain a plurality of crop images cropped in response to a change in an angle of view of the image sensor from the first image in operation 420. In the case where an angle of view is reduced by the hand trembling correction, the electronic device may crop the first image at a specific ratio depending on the reduction amount.

For example, the electronic device may obtain a plurality of crop images, such as 2281*1284, 2258*1272, 2235*1260, 2212*1248, and the like, that crop an image of a resolution of 2304*1296 which is a last frame of a preview at a specific ratio (for example, 1%). At this point, in case of determining an angle of view-reduction amount as 10%, the electronic device may crop an image of resolution of 2304*1296 at a ratio of 1% ten times to obtain ten crop images. However, the electronic device may crop a relevant image at various ratios depending on an angle of view-change value, and the number of cropped images may also vary.

The electronic device may sequentially display a plurality of obtained crop images in operation 430. The electronic device may sequentially display the plurality of obtained crop images on the screen such that they are suitable for a preview ratio. In this case, the electronic device may provide a smooth visual effect to a user by sequentially displaying the plurality of crop images within a short time.

Figure 5:
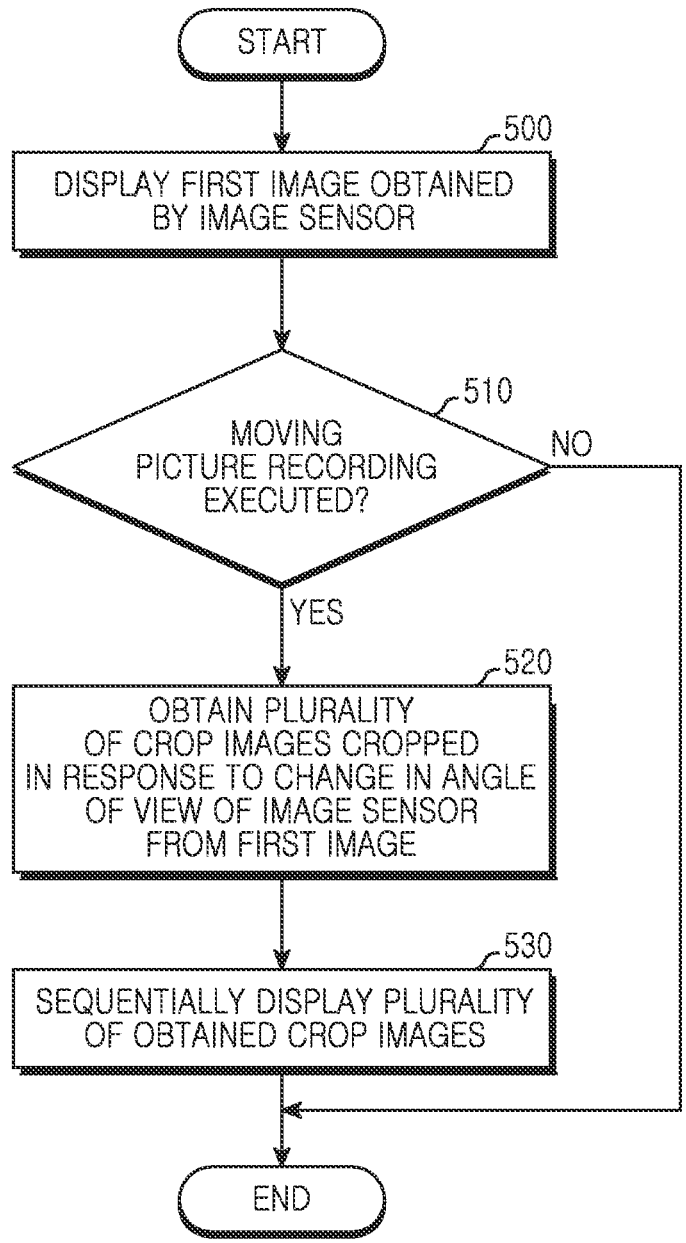
FIG. 5 is a flowchart illustrating a procedure for providing a visual effect depending on a change in an angle of view in an electronic device according to an embodiment of the present disclosure.

FIG. 5 is a flowchart illustrating a procedure for providing a visual effect depending on a change in an angle of view in an electronic device according to an embodiment of the present disclosure.

Referring to FIG. 5, the electronic device may display may display a first image obtained by an image sensor in operation 500. At this point, the electronic device may display the first image which is a preview image input from the image sensor on a screen.

The electronic device may determine whether to execute moving picture recording in operation 510. The electronic device may execute moving picture recording and simultaneously use a hand trembling correction function.

In case of executing moving picture recording, the electronic device may obtain a plurality of crop images cropped in response to a change in an angle of view of the image sensor from the first image in operation 520. In the case where an angle of view is reduced by moving picture recording, the electronic device may crop the first image at a specific ratio depending on the angle of view-reduction amount.

Figure 7A:
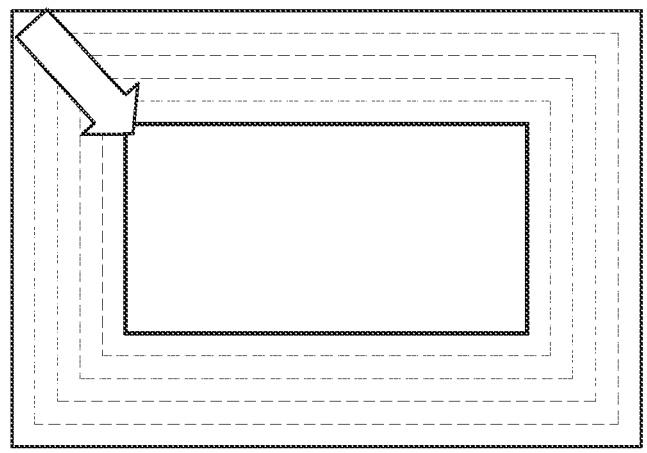
FIGS. 7A and 7B are views explaining an image crop method for providing a visual effect depending on a change in an angle of view in an electronic device according to an embodiment of the present disclosure.

FIG. 7A is a view explaining an image crop method for providing a visual effect depending on a change in an angle of view in an electronic device according to an embodiment of the present disclosure.

For example, referring to FIG. 7A, the electronic device may obtain a plurality of crop images, such as 2281*1284, 2258*1272, 2235*1260, 2212*1248, and the like, that crop an image of a resolution of 2304*1296 which is a last frame of a preview at a specific ratio (for example, 1%). In case of determining an angle of view-reduction amount as 10%, the electronic device may crop an image of resolution of 2304*1296 at a ratio of 1% ten times to obtain ten crop images. However, the electronic device may crop a relevant image at various ratios depending on an angle of view-change value, and the number of cropped images may also vary.

The electronic device may sequentially display the plurality of obtained crop images in operation 530. The electronic device may sequentially display the plurality of obtained crop images on the screen such that they are suitable for a preview ratio. In this case, the electronic device may provide a smooth visual effect to a user by sequentially displaying the plurality of crop images within a short time.

Figure 6:
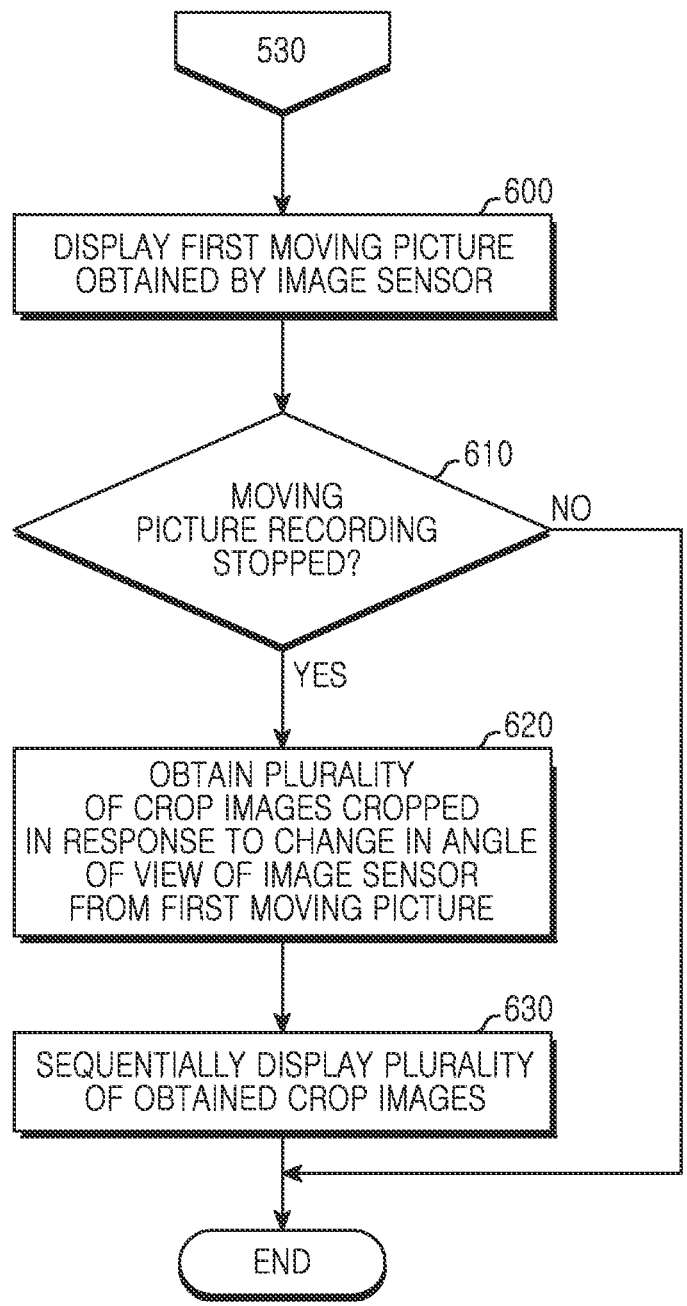
FIG. 6 is a flowchart illustrating a procedure for providing a visual effect depending on a change in an angle of view in an electronic device according to an embodiment of the present disclosure.

FIG. 6 is a flowchart illustrating a procedure for providing a visual effect depending on a change in an angle of view in an electronic device according to an embodiment of the present disclosure.

Referring to FIG. 6, after sequentially displaying the plurality of obtained crop images in operation 530 of FIG. 5, the electronic device may display a first moving picture obtained by an image sensor in operation 600. The electronic device may display the first image which is a recording image input from the image sensor on the screen.

The electronic device may determine whether to stop moving picture recording in operation 610. The electronic device may stop the moving picture recording and simultaneously release a hand trembling correction function.

In case of stopping the moving picture recording, the electronic device may obtain a plurality of crop images cropped in response to a change in an angle of view of the image sensor from the first image. In the case where an angle of view is increased by stopping of the moving picture recording, the electronic device may crop the first moving picture at a specific ratio depending on an angle of view-increase amount.

Figure 7B:
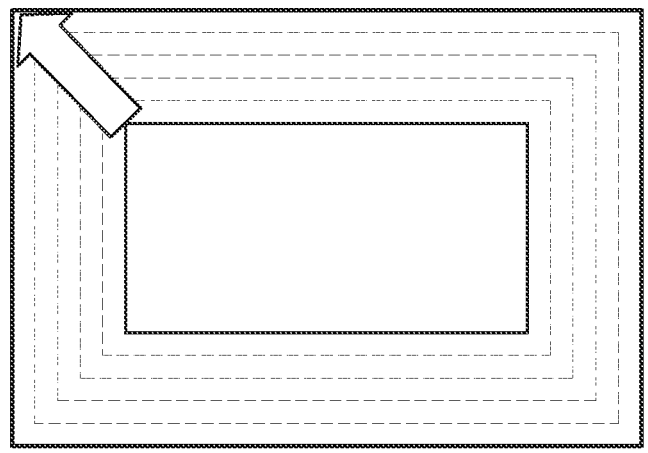

FIG. 7B is a view explaining an image crop method for providing a visual effect depending on a change in an angle of view in an electronic device according to an embodiment of the present disclosure.

For example, referring to FIG. 7B, the electronic device may obtain a plurality of crop images, such as 1943*1092, 1966*1104, 1989*1116, 2012*1128, and the like, that crop, in a way opposite to operation 520 of FIG. 5, an image of a resolution of 2304*1296 which is a last frame of a recording image at a specific ratio (for example, 1%). In case of determining an angle of view-increase amount as 10%, the electronic device may crop an image of resolution of 2304*1296 at a ratio of 1% ten times to obtain ten crop images. However, the electronic device may crop a relevant image at various ratios depending on an angle of view-change value, and the number of cropped images may be also various.

The electronic device may sequentially display the plurality of obtained crop images in operation 630. The electronic device may sequentially display the plurality of obtained crop images on the screen such that they are suitable for a preview ratio. In this case, the electronic device may provide a smooth visual effect to a user by sequentially displaying the plurality of crop images within a short time.

Figure 8A:
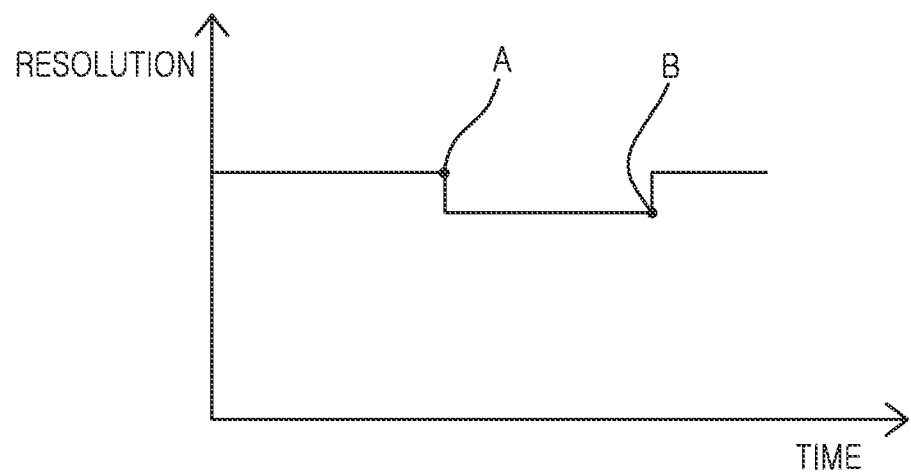
FIG. 8A is a graph showing a change state of preview resolution depending on a change in an angle of view in an electronic device according to the related art.
Figure 8B:
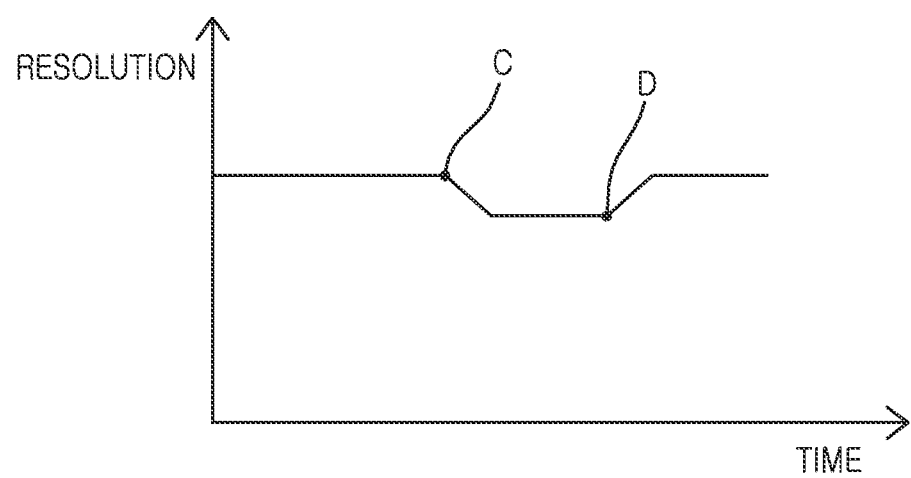
FIG. 8B is a graph showing a change state of preview resolution depending on a change in an angle of view in an electronic device according to an embodiment of the present disclosure.

FIG. 8A is a graph showing a change state of image resolution depending on a change in an angle of view in an electronic device according to the related art, and FIG. 8B is a graph showing a change state of image resolution depending on a change in an angle of view in an electronic device according to an embodiment of the present disclosure.

Referring to FIG. 8A, in the electronic device according to the related art, a screen is magnified and displayed due to a sudden change of resolution at a point A of detecting reduction of an angle of view in preview having predetermined resolution, so that the electronic device of the related art may also show an awkward screen to a user.

In contrast, referring to FIG. 8B, in an electronic device according to an embodiment of the present disclosure, resolution gradually changes at a point C of recognizing reduction in an angle of view in preview having predetermined resolution, the electronic device may provide a smooth visual effect to a user. Also, in the electronic device according to an embodiment of the present disclosure, since resolution gradually changes at a point D of recognizing an increase in an angle of view, the electronic device may also provide a smooth visual effect to a user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    displaying a first image obtained by an image sensor on a display;
    detecting whether an angle of view of the image sensor is changed;
    determining a plurality of different sizes corresponding to a plurality of crop images based on a change value in the angle of view and a size of the first image if the angle of view is changed;
    obtaining the plurality of crop images from the first image based on the plurality of different sizes; and
    sequentially displaying the plurality of crop images on the display.

2. The method of claim 1, wherein the obtaining of the plurality of crop images from the first image comprises:
    cropping the first image at a specific ratio based on the change value.

3. The method of claim 1, wherein the obtaining of the plurality of crop images from the first image comprises:
    determining a number of the plurality of crop images based on the change value.

4. The method of claim 1, wherein the sequentially displaying of the plurality of crop images on the display comprises:
    sequentially displaying the plurality of crop images in accordance with a preview ratio.

5. The method of claim 1, wherein the first image comprises a last frame image of a preview image.

6. The method of claim 1, wherein the first image comprises a last frame image of a recording image.

7. The method of claim 1, wherein the change in the angle of view of the image sensor is generated by a hand trembling correction function.

8. The method of claim 1, wherein the change in the angle of view of the image sensor is generated by moving picture recording.

9. The method of claim 1, wherein the change in the angle of view of the image sensor is generated based on a current operation mode of the electronic device.

10. An electronic device comprising:
    a display;
    a memory;
    an image sensor; and
    a processor configured to:
        control to display a first image obtained by the image sensor on the display,
        detect whether an angle of view of the image sensor is changed,
        determine a plurality of different sizes corresponding to a plurality of crop images based on a change value in the angle of view and a size of the first image if the angle of view is changed,
        obtain the plurality of crop images from the first image based on the plurality of different sizes, and
        sequentially display the plurality of crop images on the display.

11. The electronic device of claim 10, wherein the processor is further configured to crop the first image at a specific ratio based on the change value.

12. The electronic device of claim 10, wherein the processor is further configured to determine a number of the plurality of the crop images based on the change value.

13. The electronic device of claim 10, wherein the processor is further configured to sequentially display the plurality of crop images in accordance with a preview ratio.

14. The electronic device of claim 10, wherein the first image comprises a last frame image of a preview image.

15. The electronic device of claim 10, wherein the first image comprises a last frame image of a recording image.

16. The electronic device of claim 10, wherein the change in the angle of view of the image sensor is generated by a hand trembling correction function.

17. The electronic device of claim 10, wherein the change in the angle of view of the image sensor is generated by moving picture recording.

18. The electronic device of claim 10, wherein the change in the angle of view of the image sensor is generated based on a current operation mode of the electronic device.

* * * * *